US007713395B1

(12) United States Patent
James et al.

(10) Patent No.: US 7,713,395 B1

(45) Date of Patent: May 11, 2010

(54) DIELECTROPHORETIC COLUMNAR FOCUSING DEVICE

(75) Inventors: Conrad D. James, Albuquerque, NM (US); Paul C. Galambos, Albuquerque, NM (US); Mark S. Derzon, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 944 days.

(21) Appl. No.: 11/401,714

(22) Filed: Apr. 11, 2006

(51) Int. Cl.
*G01N 27/453* (2006.01)

(52) U.S. Cl. .................................................. 204/643

(58) Field of Classification Search ................. 204/547, 204/643, 600; 209/210; 436/518; 435/4, 435/5, 6, 7.1
See application file for complete search history.

(56) References Cited

U.S. PATENT DOCUMENTS

| | | | | |
|---|---|---|---|---|
| 5,814,200 | A * | 9/1998 | Pethig et al. | 204/547 |
| 5,993,632 | A * | 11/1999 | Becker et al. | 204/547 |
| 6,536,106 | B1 * | 3/2003 | Jackson et al. | 29/872 |
| 6,686,207 | B2 * | 2/2004 | Tupper et al. | 436/174 |
| 2001/0047941 | A1 * | 12/2001 | Washizu et al. | 204/547 |
| 2005/0072676 | A1 * | 4/2005 | Cummings et al. | 204/547 |
| 2007/0187248 | A1 * | 8/2007 | Hodko et al. | 204/547 |

OTHER PUBLICATIONS

Peter R. C. Gascoyne et al, "Particle separation by dielectrophoresis", Electrophoresis, vol. 23, 2002, pp. 1973-1983.

Dawn H, Bennett et al, "Combined field-induced dielectrophoresis and phase separation for manipulating particles in microfluidics", Applied Physics Letters, Dec. 2003, vol. 83 No. 23, pp. 4866-4868.

Conrad D. James, et al, "Surface Micromachined Dielectrophoretic Gates for the Front-End Device of a Biodetection System," Journal of Fluids Engineering, Jan. 2006, vol. 128 No. 14 pp. 14-19.

Murat Okandan et al, "Development of Surface Micromachining Technologies for Microfluidics and BioMEMS," Proceedings of SPIE vol. 4260 (2001), pp. 133-139.

Masao Washizu et al, "Molecular Dielectrophoresis of Biopolymers," IEEE Transactions on Industry Applications, vol. 30, No. 4, Jul./Aug. 1994 pp. 835-843.

F. Dewarrat et al, "Orientation and Positioning of DNA Molecules with an Electric Field Technique," Single Molecules Research Paper vol. 3, No. 4(2002) pp. 189-193.

Charles L. Asbury et al, "Trapping of DNA by dielectrophoresis," Electrophoresis, 2002, vol. 23, pp. 2658-2666.

Ralph Holzel, "Single particle characterization and manipulation of opposite field dielectrophoresis," Journal of Electrostatics, vol. 56 (2002) pp. 435-447.

Liming Ying et al "Frequency and Voltage Dependence of ther Dielectrophoretic Trapping of Short Lengths of DNA and dCTP in a Nanopipette", Biophysical Journal, vol. 86, Feb. 2004, pp. 1018-1027.

(Continued)

*Primary Examiner*—Alex Noguerola
(74) *Attorney, Agent, or Firm*—Kevin W. Bieg

(57) ABSTRACT

A dielectrophoretic columnar focusing device uses interdigitated microelectrodes to provide a spatially non-uniform electric field in a fluid that generates a dipole within particles in the fluid. The electric field causes the particles to either be attracted to or repelled from regions where the electric field gradient is large, depending on whether the particles are more or less polarizable than the fluid. The particles can thereby be forced into well defined stable paths along the interdigitated microelectrodes. The device can be used for flow cytometry, particle control, and other process applications, including cell counting or other types of particle counting, and for separations in material control.

11 Claims, 13 Drawing Sheets

OTHER PUBLICATIONS

Chia-Fu Chou et al, "Electrodeless Dielectrophoresis of Single- and Double-Stranded DNA" Biophysical Journal, vol. 83, Oct. 2002, pp. 2170-2179.

Lifeng Zheng, "Electronic manipulation of DNA, proteins, and nanoparticles for potential circuit assembly" Biosensors and Bioelectronics, vol. 20 (2004) pp. 606-619.

* cited by examiner

Section A - A

Section A - A

DIELECTROPHORETIC COLUMNAR FOCUSING DEVICE

STATEMENT OF GOVERNMENT INTEREST

This invention was made with Government support under contract no. DEAC04-94AL85000 awarded by the U.S. Department of Energy to Sandia Corporation. The Government has certain rights in the invention.

FIELD OF THE INVENTION

The present invention relates to devices for the manipulation of microparticles and, in particular, to a dielectrophoretic columnar focusing device that uses electric fields for confining microparticles within fluid streamlines inside a microfluidic channel.

BACKGROUND OF THE INVENTION

Flow cytometry is a technology that can simultaneously measure and then analyze physical characteristics of single particles, usually cells, as they flow in a fluid stream through a beam of light. Many biochemical procedures require isolating cells of a uniform type from a tissue containing a mixture of cell types.

For example, cell separation is often used to analyze the DNA content of individual cells. In a typical cell-separation technique, DNA or antibodies coupled to a fluorescent dye are used to label specific cells. The labeled cells can then be separated from the unlabeled cells in a flow cytometer, also known as a fluorescence-activated cell sorter. A typical flow cytometer lines particles up in single file in a fine stream. The individual cells traveling single file pass through a laser beam and the fluorescence of each cell is measured. Selected cells can then be separated from the fluid stream using a vibrating nozzle to form droplets containing single cells. This technique can sort many thousands of cells per second.

The cytometer fluid system must transport the particles in a fluid stream to the laser beam for interrogation. For optimal illumination, the particles should be positioned in the center of the laser beam and only one cell or particle should move through the laser beam at a given moment. However, as shown in FIG. 1A, under normal pressure-driven laminar flow in a microfluidic channel, the fluid velocity profile is governed by a parabolic relation: fluid velocities near channel walls go to zero, while fluid velocities near the center of the channel are maximized. Particles carried along fluid streamlines will thus observe the same fluid velocity profile, with particles near walls moving slowly and particles in the center moving rapidly. As shown in FIG. 1B, this presents problems for optical detection schemes that rely on uniform particle velocities. With integration detectors, such as a photodetector, the detector will be unable to differentiate between a large number of fast moving particles and a low number of slow moving particles since both cases will produce similar optical signals. In addition, particles at different planes in the channel will be either in or out of focus of the optical detection system, also giving variability in optical detection signals.

To solve these problems, most conventional flow cytometers use hydrodynamic focusing, wherein the sample is injected into a stream of shealth fluid within the flow channel. The sample core remains separate but coaxial within the shealth fluid, enabling the laser beam to interact with the particles that are focused to a thin-core fluid streamline. However, hydrodynamic focusing requires that additional flow streams be added to the system, complicating fabrication, fluid routing, and waste disposal. Therefore, a need remains for a simplified focusing device to confine microparticles within fluid streamlines inside a microfluidic channel.

SUMMARY OF THE INVENTION

The present invention is directed to a dielectrophoretic (DEP) columnar focusing device, comprising an insulating substrate; a set of interdigitated microelectrodes comprising at least two opposing microelectrode fingers, on the insulating substrate; a fluid, containing at least one particle, in electromagnetic contact with the set of interdigitated microelectrodes; and means for applying a differential alternating current electrical potential between the at least two opposing microelectrode fingers to generate a spatially non-uniform electric field in the fluid, thereby polarizing the at least one particle and causing the polarized particle to move in response to a gradient in the electric field. The opposing microelectrode fingers can comprise at least one double-forked finger. To generate large electrical field gradients and, therefore, a large DEP force, the microelectrode fingers can be fabricated using photolithography and can have widths as small as one micron or less. The alternating frequency is preferably greater than 100 kHz and, more preferably a radio frequency in the MHz range. The device can preconcentrate, focus, and separate particles with diameters on the order of the spacing between the microelectrode fingers. For example, the device can be used to preconcentrate and separate pollen, biological cells, and polyelectrolytes, including strands of DNA.

The DEP columnar focusing device of the present invention eliminates the need for adding a sheath flow of fluid, required to focus particles to a thin-core fluid streamline in hydrodynamic-focusing-based flow cytometry systems. Rather, the device uses dielectrophoresis to position the particles in a cylindrical potential well that minimizes dispersion in particle velocity throughout the cross-section of a microfluidic channel. As shown in FIG. 2A, the DEP columnar focusing device confines particles to a narrow height (reasonably assuming all the particles weigh the same) and axial dimension (away from fluid channel walls). This simplifies particle counting and detection, since particles are confined to the same streamline and travel at the same velocity. As shown in FIG. 2B, this axial confinement provides uniform velocity distributions to the particles while keeping them in the same focus plane for optical detection.

Focusing is easy to control with the DEP device. Focusing can be turned on or off simply by applying a voltage to a configuration of microelectrodes. Using MHz frequency voltages eliminates the generation of electrolysis bubbles and corrosion effects, and also enables precise tuning of the DEP force to the particular particle in question. The device can also be used to separate particles based on their dielectric properties by changing the actuation frequency. A single microelectrode configuration can be used and the fields changed to process different particles and/or fluids. Particles can be spatially controlled to better than 1 micron.

Applications for the device include flow cytometry, particle control, and process applications that require cell counting, or other types of particle counting, or particle separations in material control.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 13A shows the focusing of a dsDNA kbp sample. FIG. 13B shows no significant focusing of an ssDNA 60 bp sample.

DETAILED DESCRIPTION OF THE INVENTION

Figures 1A, 1B:
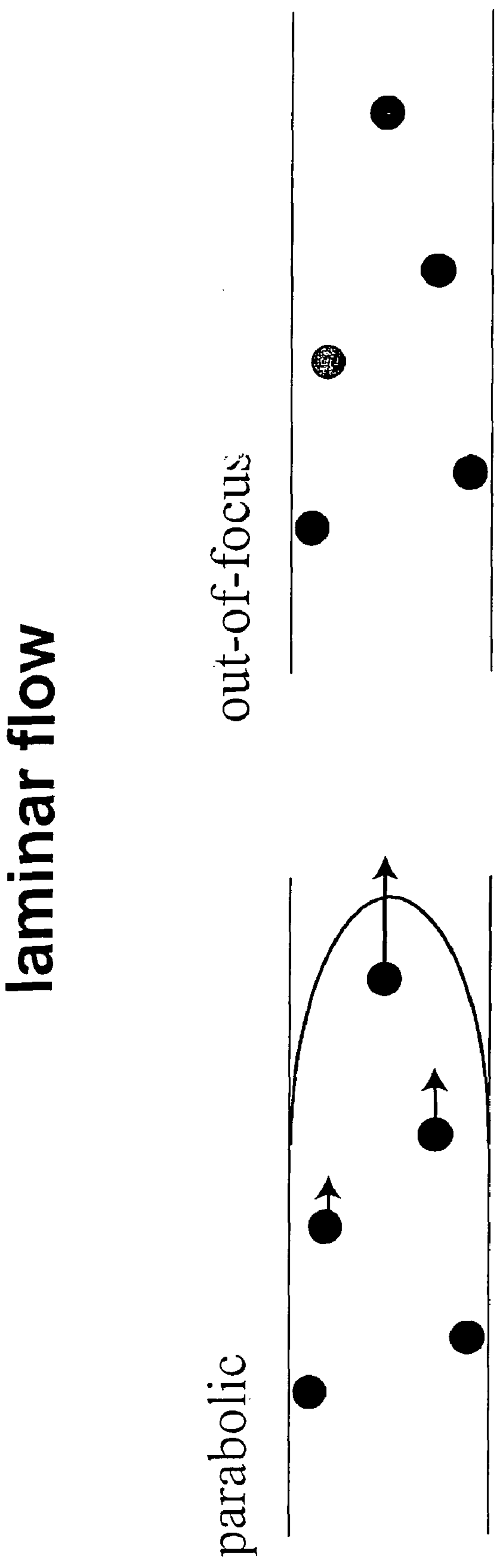
FIG. 1A shows a schematic illustration of the parabolic particle velocity profile in a normal, pressure-driven laminar flow in a microfluidic channel.
FIG. 1B shows a schematic illustration of a distribution of particles across a microfluidic channel in normal laminar flow, indicating that most of the particles are out of focus for optical detection schemes.
Figures 2A, 2B:
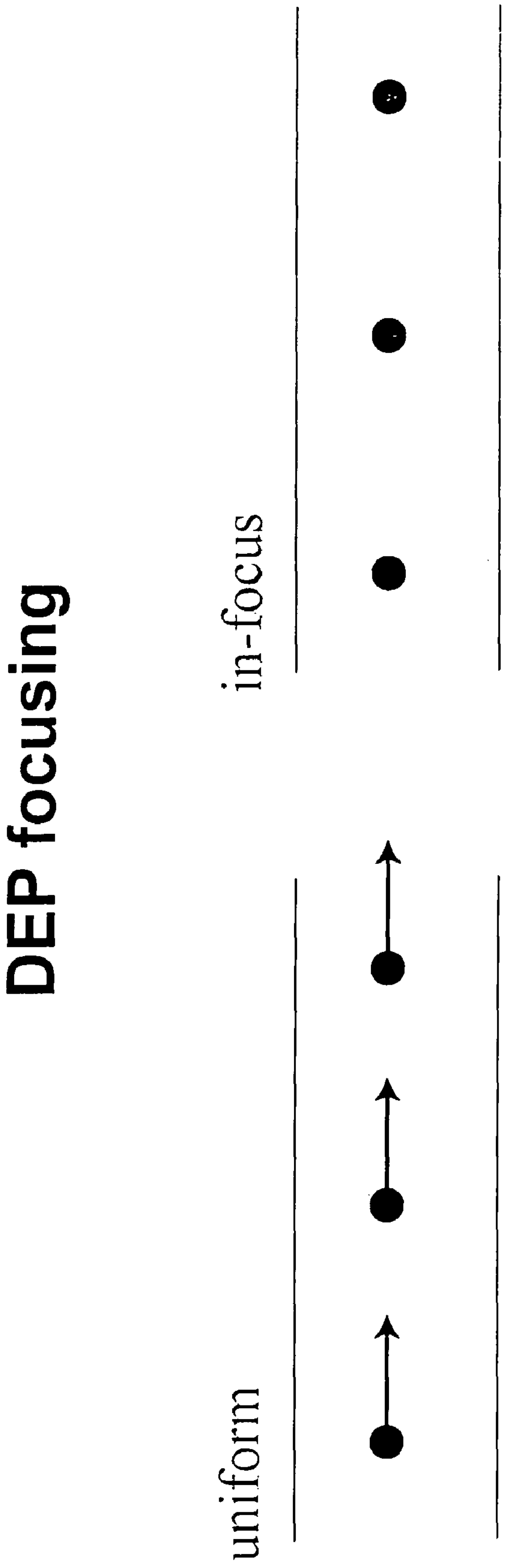
FIG. 2A shows a schematic illustration of the particle velocity profile in a DEP columnar focusing device, indicating that particles are confined to the same streamline and travel at the same velocity.
FIG. 2B shows a schematic illustration of particles confined to a narrow height and axial dimension, thereby keeping the particles in the same focus plane for optical detection.

Any inhomogeneity in an electric field will cause a polarizable particle to move under a dielectrophoretic force. In particular, the electric field generated by an arrangement of microelectrodes will cause particles to polarize, or to shift positive and negative charges within the particle, generating a dipole within the particle which will then interact with the field. Under this force, the particle is either attracted to or repelled from regions where the electric field gradient is large, depending on whether the particle is more or less polarizable than the liquid, respectively. These forces can be used to push or pull (i.e., focus) particles onto a well defined stable path.

When exposed to the spatially non-uniform electric field generated by microelectrodes, a particle flowing in a fluid through a channel will polarize and interact with the electric field, generating a time-averaged dielectrophoretic force, $F_{DEP}$, which is given by:

$$F_{DEP} = \frac{3}{2}\varepsilon_0\varepsilon_f V_p \mathrm{Re}(\beta^*(\omega))\nabla E_{rms}^2 \tag{1}$$

where $\epsilon_0$, and $\epsilon_f$ are the vacuum and fluid permittivity, respectively, $V_p$ is the particle volume, $\mathrm{Re}(\beta^*(\omega))$ is the real component of the relative particle polarization $\beta^*(\omega)$ at frequency ω, and $\nabla E_{rms}^2$ is the gradient of the squared root-mean-square electric field. The electric field must be non-uniform ($\nabla E_{rms}^2 \neq 0$), and a difference in the polarizabilities between the particle and the fluid must exist in order for particle motion to occur by DEP. The gradient in the electric field leads to a nonsymmetrical dipole in the particle. This produces a net force on the particle accompanied by motion. If the particle is more polarizable than the fluid ($\mathrm{Re}(\beta^*(w))>0$), the particle will migrate towards regions of high $\nabla E_{rms}^2$, termed positive dielectrophoresis (pDEP). If the particle is less polarizable than the fluid ($\mathrm{Re}(\beta^*(w))<0$), the particle will migrate towards regions of low $\nabla E_{rms}^2$, termed negative dielectrophoresis (nDEP). See T. B. Jones, *Electromechanics of Particles*, Cambridge Univ. Press, Cambridge, (1995); and P. R. C. Gascoyne et al., "Particle separation by dielectrophoresis," *Electrophoresis* 23, 1973 (2002). Microscale separation of bacteria and polymer microspheres using DEP and an accompanying field-induced phase separation has been demonstrated. However, these techniques have not been applied to particle focusing. See D. J. Bennett et al., "Combined field-induced dielectrophoresis and phase separation for manipulating particles in microfluidics," *Applied Physics Letters* 83, 4866 (2003); and C. D. James et al., "Surface Micromachined Dielectrophoretic Gates for the Front-End Device of a Biodetection System," *Trans. ASME* 128, 14 (2006), which are incorporated herein by reference.

In the radio frequency range, the relative polarizability of a particle immersed in a fluid is mainly influenced by the ratio of capacitances of the particle and the fluid, so that a reasonable estimate of $\mathrm{Re}(\beta^*)$ is given by:

$$\mathrm{Re}(\beta^*) \approx \frac{\varepsilon_p - \varepsilon_f}{\varepsilon_p + 2\varepsilon_f}. \tag{2}$$

where $\epsilon_p$ is the particle permittivity. For example, deionized (DI) water has a moderate polarizability, while insulating materials such as latex or silica have low polarizability. The dielectric constant of water at radio frequencies is about 80. In contrast, dielectric constants of typical microparticles (e.g., latex or silica) fall in the range 1.5-15. Since the particle polarization in the radio frequency range is mainly specified by its bulk dielectric constant, these types of materials when dispersed in water will exhibit strong nDEP. Preferably, an AC field in the radio-frequency range (1-30 MHz) is employed to limit undesirable electric effects in water, such as electrolysis, electroosmosis, and electroconvection. For example, the electrolysis of water can produce gas bubbles that can clog microfluidic devices. Since electrophoretic effects also vanish at higher frequencies, operation in the MHz range allows separation based on bulk polarization properties of a particle, given by Re(β*), that are insensitive to the particle surface properties which may vary randomly due to environmental effects or intentionally due to aerosolization. Elimination of these undesirable electrical effects using MHz frequencies therefore allows the use of larger voltage amplitudes (e.g., 20 V peak-to-peak, p-p).

Figure 3A:
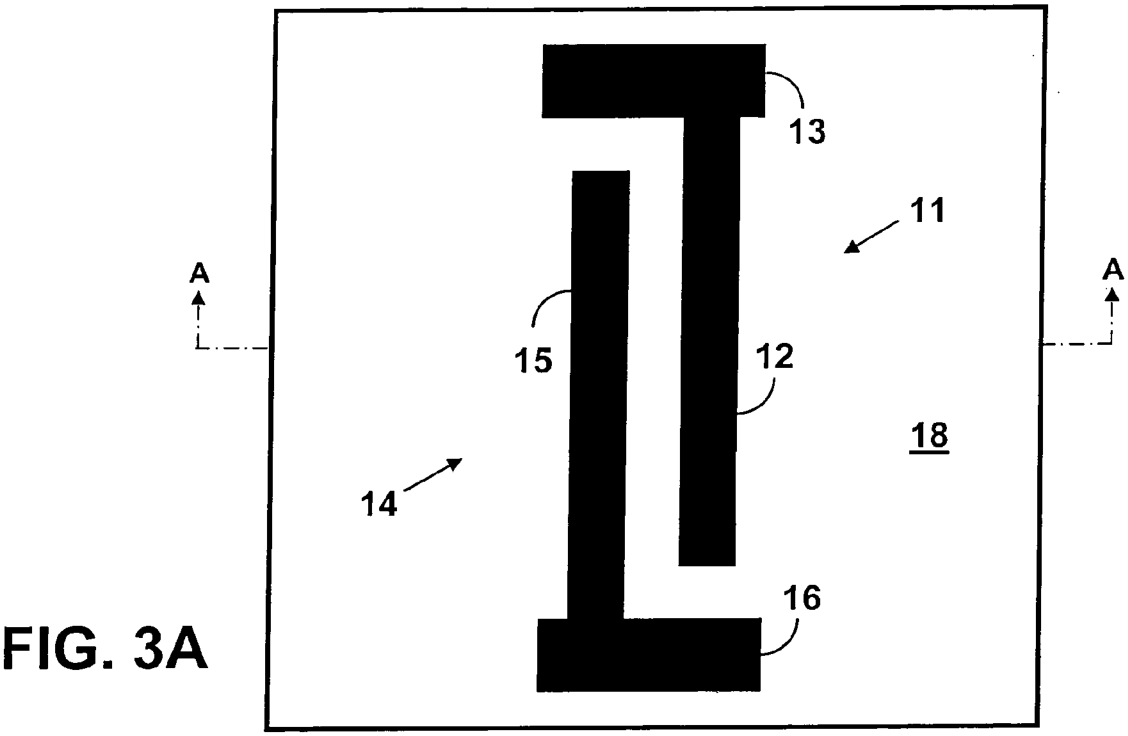
FIG. 3A shows a schematic top view illustration of a DEP columnar focusing device, comprising a set of interdigitated microelectrodes having two opposing microelectrode fingers on an insulating substrate.

In FIG. 3A is shown a schematic top view illustration of a simple dielectrophoretic columnar focusing device 10 comprising a set of interdigitated electrodes 11 and 14 having two opposing microelectrode fingers 12 and 15 on an insulating substrate 18. Electrical connections can be made to the interdigitated microelectrodes 11 and 14 at contact ends 13 and 16.

Figure 3B:
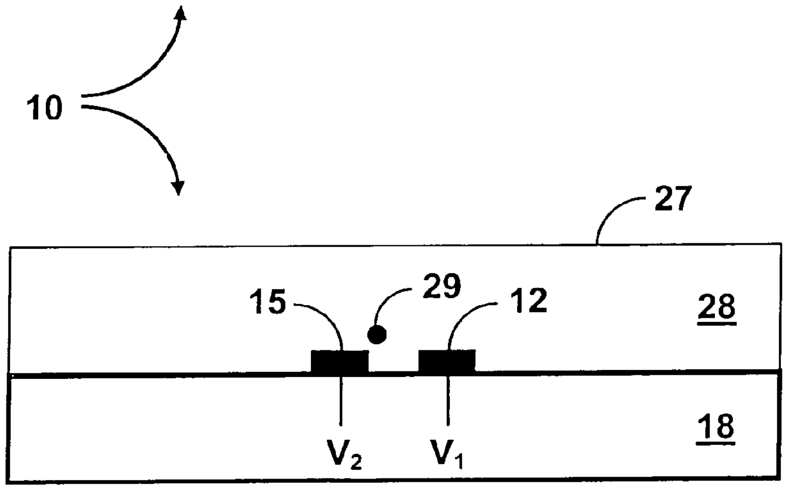
FIG. 3B shows a cross-sectional side view illustration of the DEP columnar focusing device.

In FIG. 3B is shown a cross-sectional side view illustration of the DEP columnar focusing device 10. A microfluidic channel 27, comprising a fluid 28 containing at least one particle 29, can be disposed on the substrate 18. The particle-containing fluid 28 is in electromagnetic contact with the microelectrode fingers 12 and 15 (i.e., the electric field generated by the interdigitated microelectrodes penetrates into the fluid). For example, the fluid can be in direct fluidic contact with the microelectrode fingers (as shown), or the flow channel 27 can be fabricated in a fully encapsulated state and separated from the microelectrode fingers 12 and 15 by an insulating layer. See M. Okandan et al., "Development of Surface Micromachining Technologies for Microfluidics and BioMEMS," *Proc. of SPIE* 4560, 133 (2001). The opposing microelectrode fingers 12 and 15 can be activated by different applied AC biases $V_1$ and $V_2$ to generate the spatially non-uniform electric field in the fluid 28 above the interdigitated microelectrodes 11 and 14.

Figure 4:
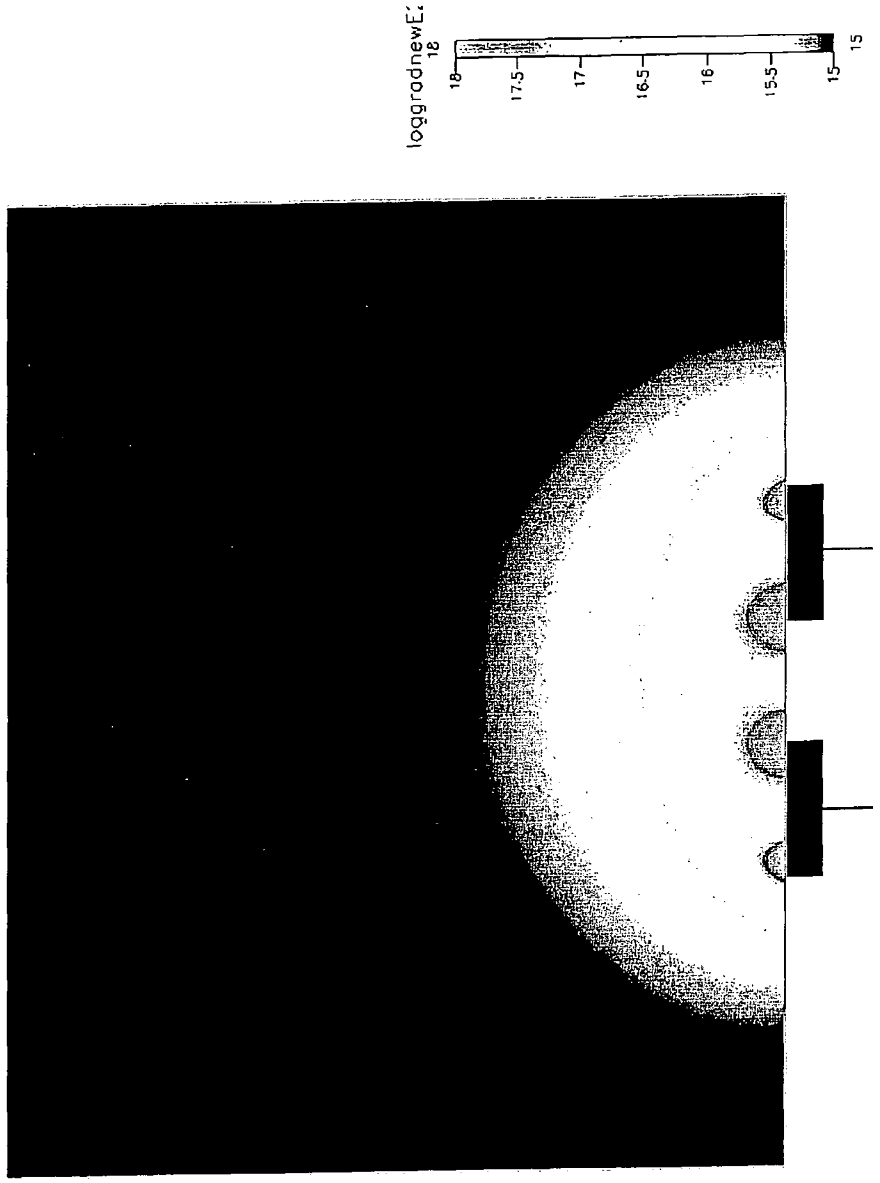
FIG. 4 shows a two-dimensional simulation of the electric field gradient, $\nabla E_{rms}^2$, produced above the opposing fingers of the set of interdigitated microelectrodes shown in FIG. 3B.

In FIG. 4 is shown a two-dimensional simulation of the electric field gradient, $\nabla E_{rms}^2$, produced above the opposing fingers of the set of interdigitated microelectrodes shown in FIGS. 3A and 3B. The individual fingers were biased to 5V and 0V. Large field gradients are produced at the edges of the microelectrode fingers at the opposing potentials. High polarizability particles will be attracted to these edges by the pDEP force. Low polarizability particles will be repulsed away from the fingers by the nDEP force to regions above and to the sides of the microelectrode surfaces.

Figure 5A:
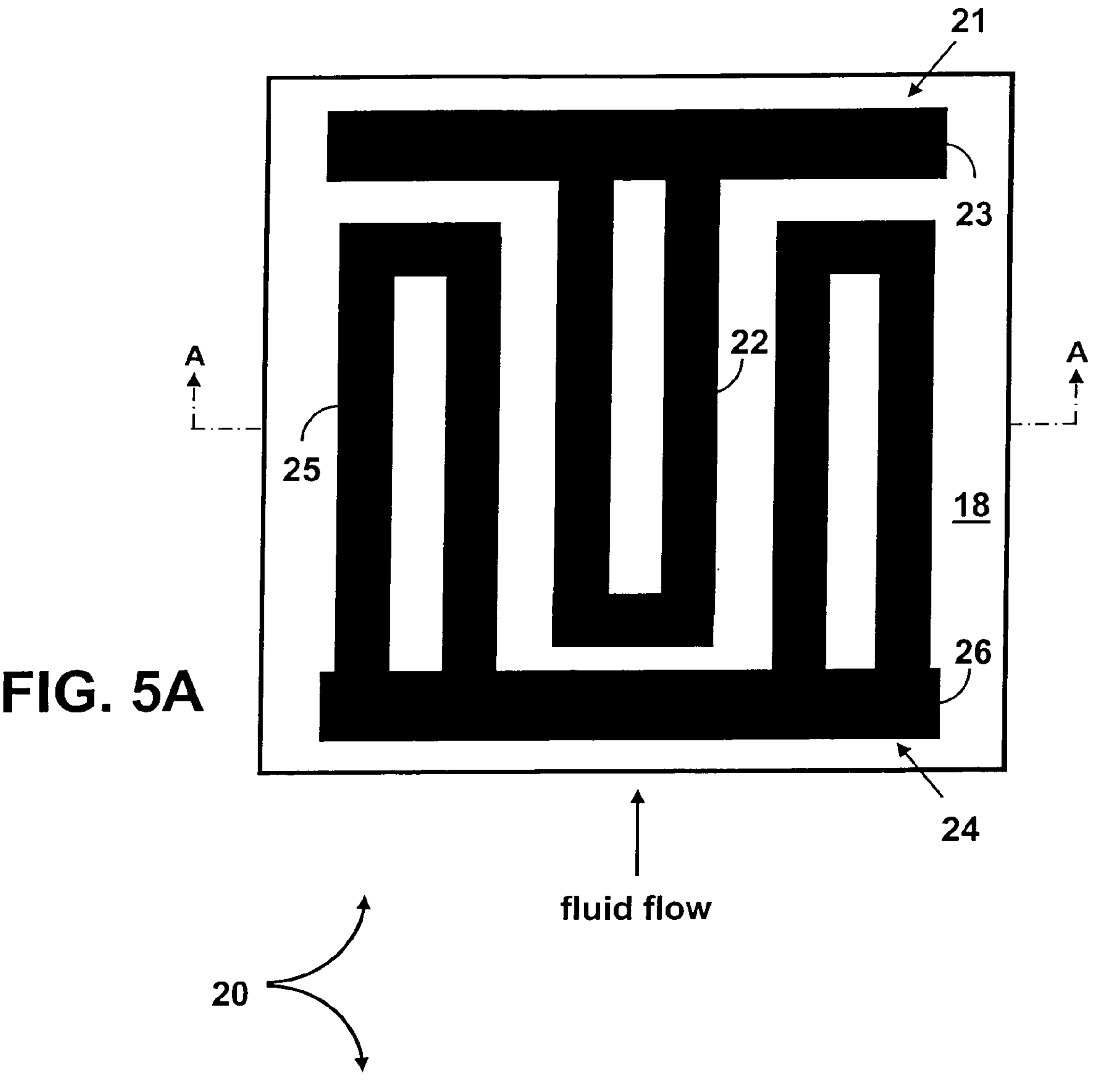
FIG. 5A shows a schematic top view illustration of a DEP columnar focusing device, comprising a set of interdigitated microelectrodes having opposing double-forked microelectrode fingers on an insulating substrate.

In FIG. 5A is shown a schematic top view illustration of another dielectrophoretic columnar focusing device 20 comprising a set of interdigitated microelectrodes 21 and 24 on an insulating substrate 18. The interdigitated microelectrodes 21 and 24 comprise at least two opposing microelectrode fingers 22 and 25. Each of the opposing microelectrode fingers 22 and 25 can be double-forked fingers, as shown. Electrical connections can be made to the interdigitated microelectrodes 21 and 24 at contact ends 23 and 26. If there is a component of the fluid flow that is parallel to the fingers 22 and 25, particles can be made to travel in single files lines until they reach stacking points towards the end of the interdigitated fingers.

Figure 5B:
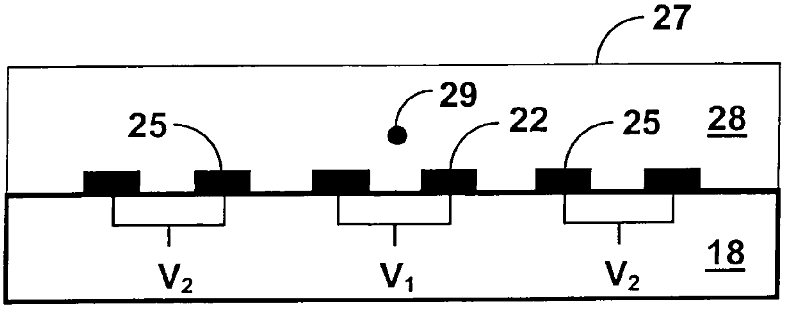
FIG. 5B shows a cross-sectional side view illustration of the DEP columnar focusing device.

In FIG. 5B is shown a cross-sectional side view illustration of the DEP columnar focusing device 20. The set of interdigitated microelectrodes 21 and 24 can be fabricated on the insulating substrate 18. A microfluidic channel 27, comprising a fluid 28 containing at least one particle 29, can be disposed on the substrate 18. The particle-containing fluid 28 is in electromagnetic contact with the microelectrode fingers 22 and 25. The opposing microelectrode fingers 22 and 25 can be activated by different applied AC biases $V_1$ and $V_2$ to generate the spatially non-uniform electric field in the fluid 28 above the interdigitated microelectrodes 21 and 24.

The use of a repulsive DEP force in the fluid above the interdigitated microelectrodes provides a dynamic stability with the downward gravitational force on the particle. In the case of a particle subjected to an nDEP force within the vicinity of the interdigitated microelectrodes, the gravitational force on the bead will be balanced by the levitating nDEP force:

$$F_{DEP}=(\rho_p-\rho_f)V_p g \qquad (3)$$

where $\rho_p$ is the density of the particle, $\rho_f$ is the density of the fluid, $V_p$ is the particle volume, and g is the acceleration constant. The particle will migrate to a height above the plane of the microelectrodes until the nDEP and gravitational forces balance and Eq. (3) is satisfied. The horizontal position of the particle will also adjust until the net DEP force horizontally is zero. This balancing will occur about symmetry points in the electrical field.

Figure 6B:
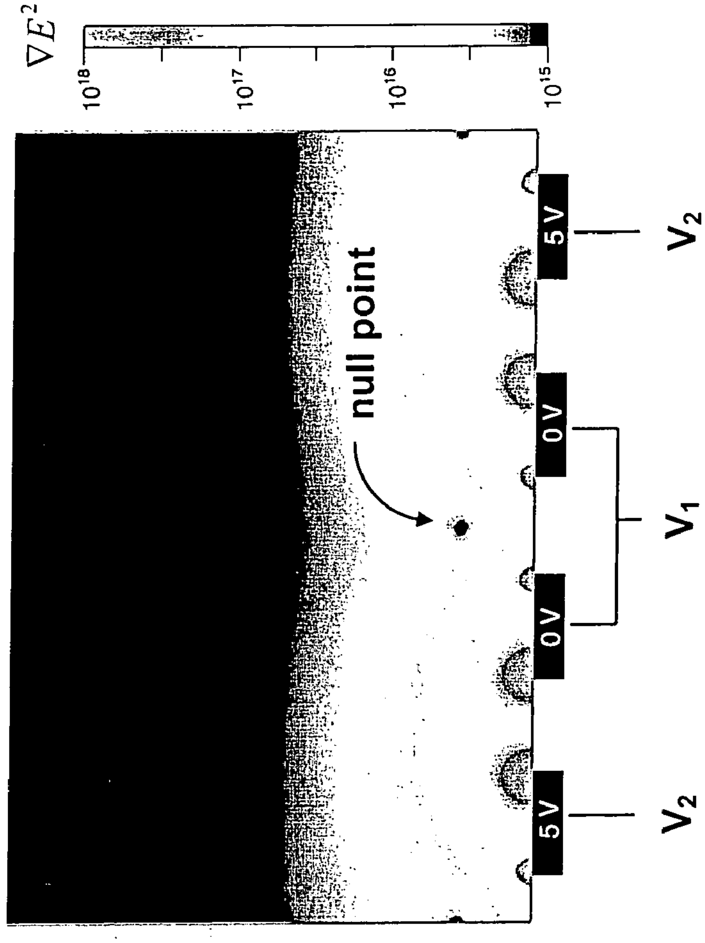
FIG. 6B shows a two-dimensional simulation of the electric field gradient, $\nabla E_{rms}^2$, produced above the double-forked fingers.
Figure 6A:
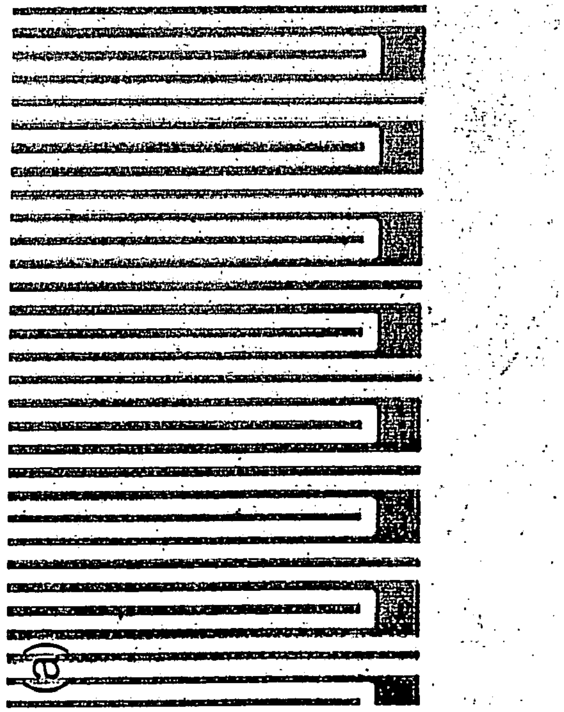
FIG. 6A shows an optical micrograph of an actual set of interdigitated microelectrodes having double-forked fingers.

In FIG. 6A is shown an optical micrograph of an actual set of interdigitated microelectrodes, comprising double-forked microelectrode fingers. The individual forks are 5 μm wide with 5 μm spaces between the forks. The device was fabricated using conventional metal lift-off technique on a glass substrate. The glass substrate was prepared using a chrome mask to pattern photoresist into the inverse pattern of the interdigitated microelectrodes. An adhesion layer of 10 nm of titanium was deposited into the openings in the patterned photoresist, followed by 100 nm of platinum. The resist was then removed with sonication in acetone, leaving the metal interdigitated microelectrodes on the glass substrate.

In FIG. 6B is shown a two-dimensional simulation of the electric field gradient, $\nabla E_{rms}^2$, produced above the double-forked fingers of the set of interdigitated microelectrodes shown in FIG. 5B. The individual forks were biased to 5V∠0°, 5V∠180°, 5V∠180°, 5V∠0°, left to right. Symmetry conditions are on the left and right sides of the simulation region. This device can produce large field gradients ($\nabla E_{rms}^2 \sim 10^{18} V^2/m^3$). The large field gradients are produced at the edges of the microelectrode fingers at the opposing potentials (i.e., 5V and 0V). High polarizability particles will migrate toward these regions. Conversely, low polarizability particles will be repulsed away from the microelectrodes by the nDEP force. In the case of a fluid channel with microelectrodes on the bottom surface, as shown, these particles will be suspended above the floor of the channel. Minima in the electric filed gradient occur between the forks of each double-forked finger. A null point (dark central spot in plot) in the $\nabla E_{rms}^2$ distribution is located along the centerline of each double-forked finger, and about four microns above the plane of the microelectrodes. Given this microelectrode configuration, particles of a particular size will be focused near the null points. Thus, small particles (≦1 μm) undergoing nDEP will migrate toward the null points near the microelectrodes or to regions far above the microelectrode surfaces (≧15 μm). For larger particles, the width and spacing of the microelectrode fingers can be modified to suitably suspend the particles. As will be apparent to those skilled in the art, alternative interdigitated microelectrode structures and finger geometries can be used to provide alternative DEP field configurations.

Levitation and Focusing of Latex-Coated Magnetic Particles

Figure 7:
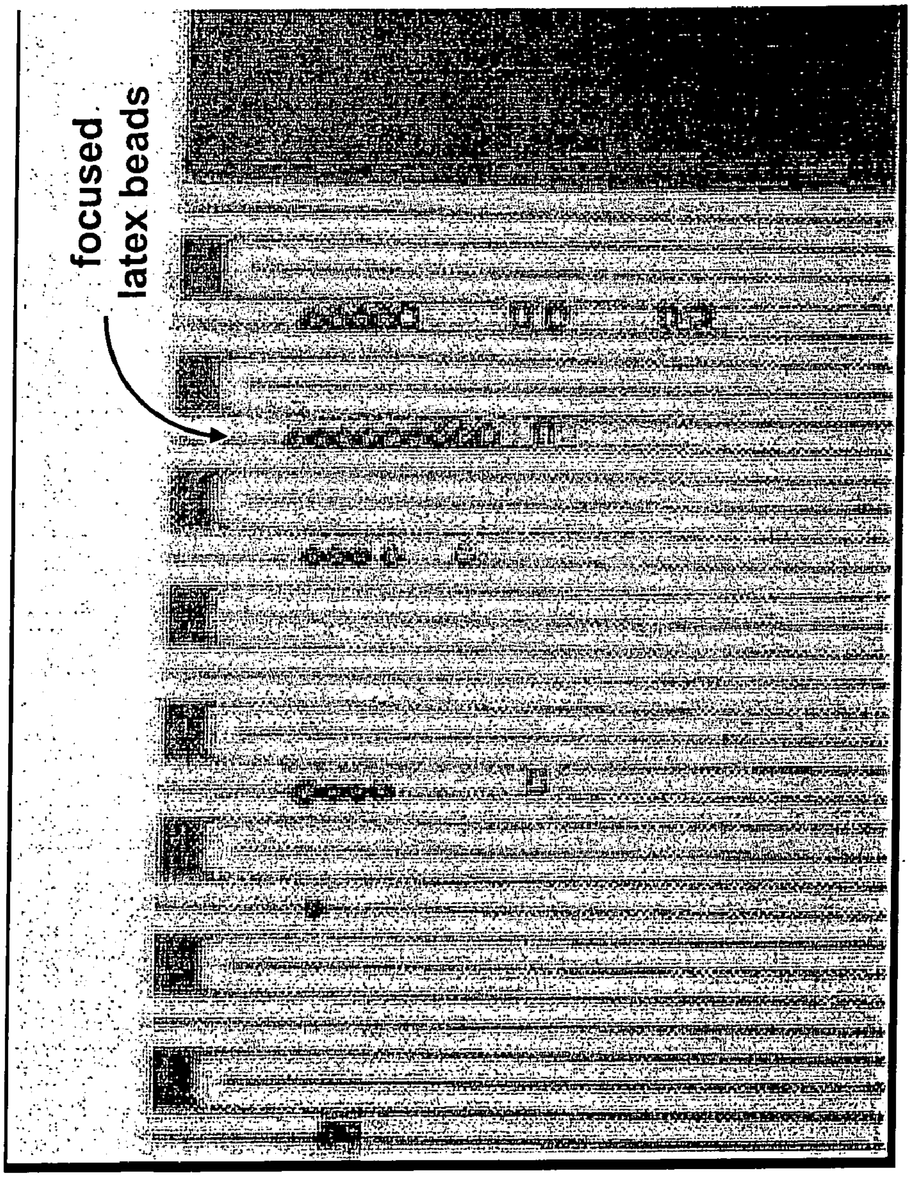
FIG. 7 shows a photograph of 8.5-μm-diameter latex beads suspended above the plane of the interdigitated microelectrodes of the device shown in FIG. 6A. The interdigitated microelectrodes were biased at 20 V p-p and 2 MHz.

In FIG. 7 is shown a photograph of a collection of superparamagnetic latex beads suspended above the microelectrode plane by a 20 V p-p, 2 MHz excitation signal. The latex beads are 8.5 μm in diameter, and contain particles of magnetite and fluorescent tags. The beads undergo nDEP to about 20 μm above the interdigitated microelectrodes, and come to rest in the columnar valleys of low $\nabla E_{rms}^2$. These particles are too large to fit in the sharp null points created in the field close to the microelectrodes, so they are levitated to a distance above the plane of the microelectrodes that balances their weight and minimizes free energy. Fluid flow was from the bottom to the top of the image. Therefore, the particles traveled in single files lines until they reach the stacking point towards the end of a microelectrode (where the double-forked fingers wraps around and a maximum in the gradient occurs).

Figure 8:
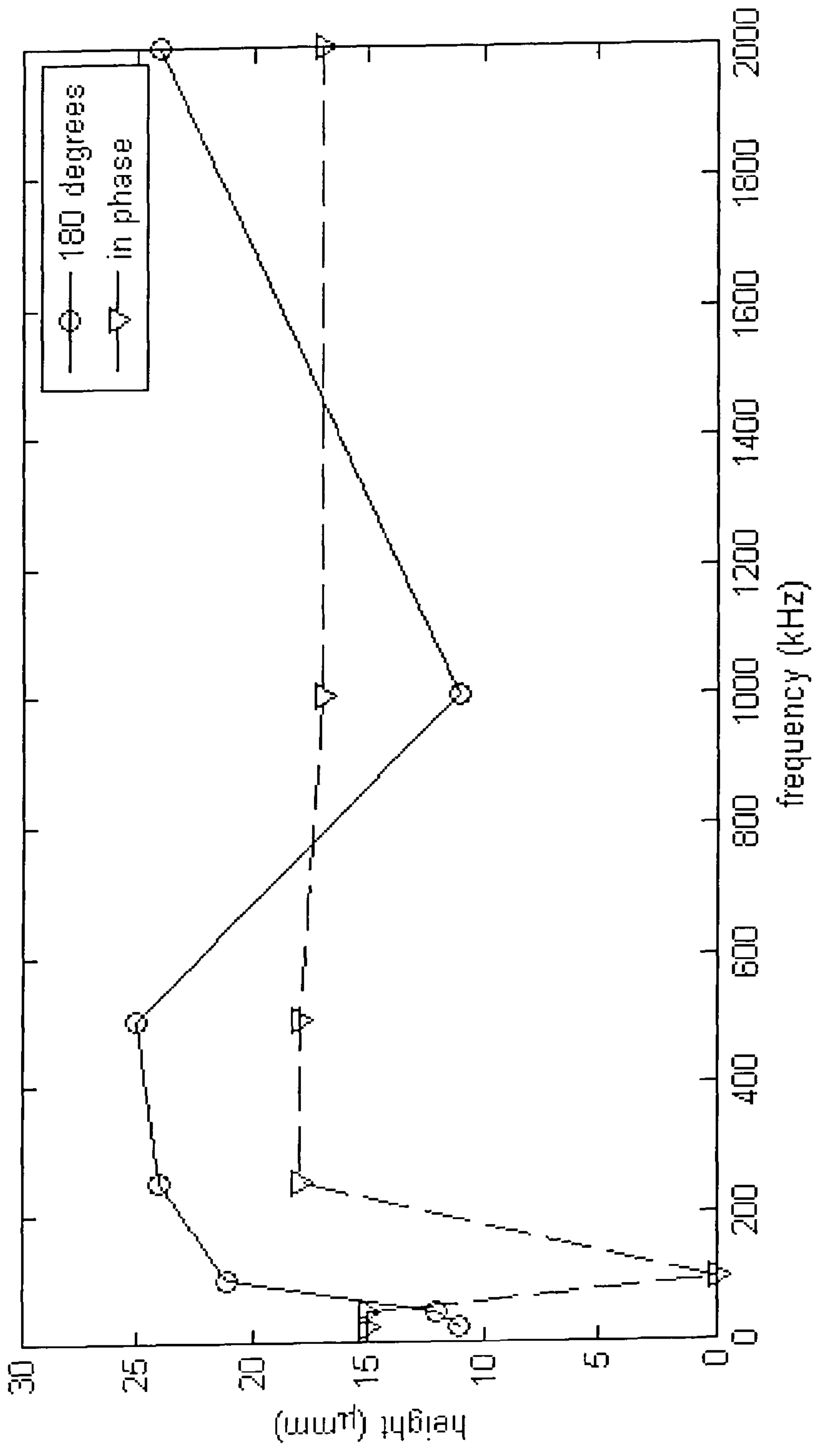
FIG. 8 shows a plot of the levitation height of the latex beads as a function of frequency.

Optical measurements were made to determine the levitation height of the latex beads as a function of voltage amplitude and frequency. In FIG. 8 is shown a plot of the levitation height of the 8.5-μm-diameter beads as a function of frequency. For most frequencies, the 180°-phased microelectrodes generated a substantial increase in DEP repulsive force, as indicated by the greater levitation height. Further, higher frequencies and larger amplitudes tended to produce higher levitation heights. The levitation effect tends to drop off as lower frequencies are approached, indicating the dominance of lower frequency electrochemical effects, such as AC electroosmosis and electrophoresis.

Focusing of Pollen

Figure 9:
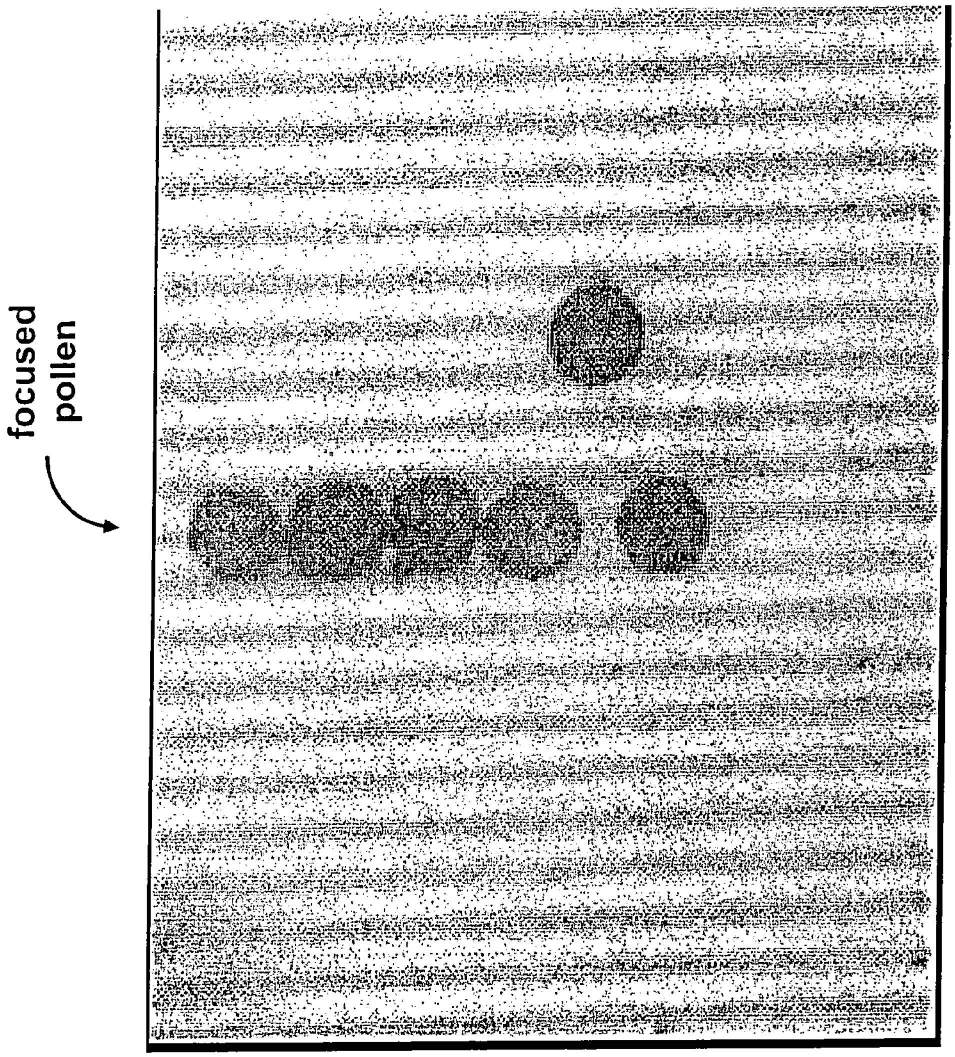
FIG. 9 shows a photograph of 25-μm-diameter ragweed pollen particles beads suspended above the plane of the interdigitated microelectrodes of the device shown in FIG. 6A. The interdigitated microelectrodes were biased at 8 V p-p and 25 kHz.

In FIG. 9 is shown 25-μm-diameter ragweed pollen particles polarizing and forming a column upon the application of an 8 V p-p, 25 kHz excitation signal. This demonstrates the ability to manipulate (i.e., levitate and focus under nDEP) pollen in low conductivity DI water. This technique could be used for profiling air samples for different quantities and types of pollen particles in air quality applications.

Focusing of DNA Strands

The DEP columnar focusing device can also be used to separate small polyelectrolytes, such as DNA, a phenomenon that has been studied by numerous labs. See M. Washizu et al., "Molecular Dielectrophoresis of Biopolymers," *IEEE Transactions on Industry Applications* 30, 835 (1994); F. Dewarrat et al., "Orientation and Positioning of DNA Molecules with an Electric Field Technique," *Single Molecules* 3, 189 (2002); C. L. Asbury et al., "Trapping of DNA by dielectrophoresis," *Electrophoresis* 23, 2658 (2002); R. Holzel, "Single particle characterization and manipulation by opposite field dielectrophoresis," *Journal of Electrostatics* 56, 435 (2002); and L. Ying et al., "Frequency and Voltage Dependence of the Dielectrophoretic Trapping of Short Lengths of DNA and dCTP in a Nanopipette," *Biophysical Journal* 86, 1018 (2004). For example, polymerase chain reaction (PCR) techniques involve hybridizing a single-stranded DNA (ssDNA) reporter oligonucleotide (e.g., about 50 base pairs) to a target double-stranded DNA (dsDNA) molecule (e.g., greater than 1000 bp) for subsequent amplification. The ssDNA binds to a ss tail of the dsDNA target. A difficulty with this techniques is that the unhybridized reporter oligonucleotides need to be separated from hybridized target-reporter molecules, otherwise the unhybridized oligonucleotides can produce false positives in the detector. Therefore, a need remains for the development of new on-chip methods to separate dsDNA from ssDNA.

Figure 10B:
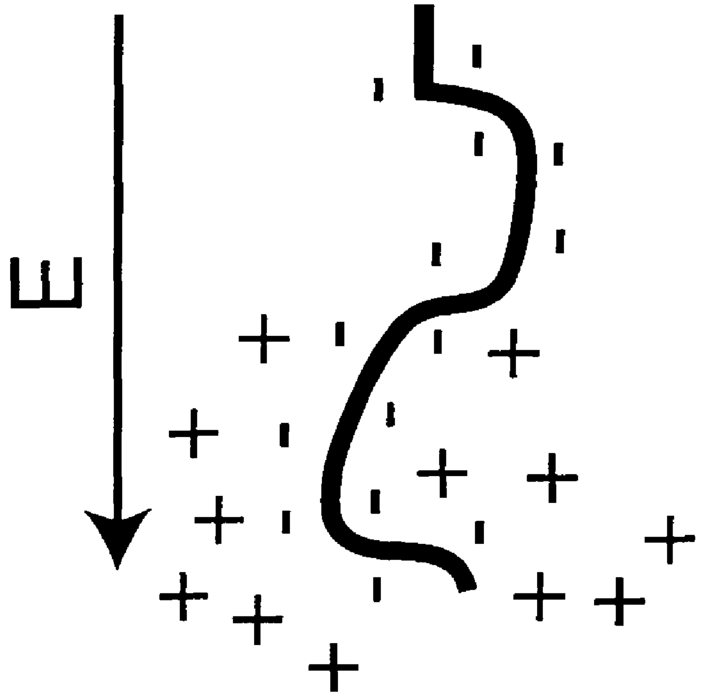
FIG. 10B shows the counterion cloud polarized under an electric field.
Figure 10A:
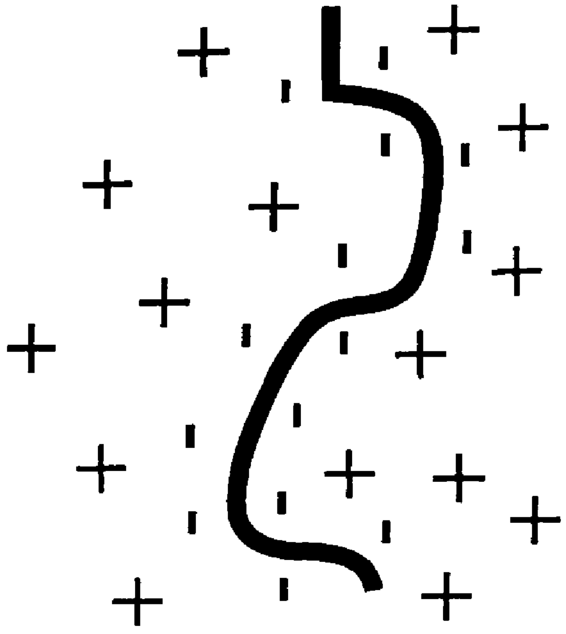
FIG. 10A shows a schematic illustration of a DNA molecule with its negatively charged backbone surrounded by a counterion cloud.

Shown in FIGS. 10A and 10B is a DNA molecule suspended in a fluid with permittivity $\in_f$ and conductivity $\sigma_f$. As shown in FIG. 10A, DNA molecules are negatively charged due to the phosphate group on each nucleotide. In the case where a particle and fluid have different permittivities and conductivities, charge will build up at the interface between the particle and the fluid. These negative charges are shielded by a counterion cloud, producing charge neutrality for the molecule. As shown in FIG. 10B, when an electric field is applied the mobile counterion cloud shielding the DNA molecule is distorted, producing a net charge density $\sigma_m$ along the length of the molecule. See C. Chou et al., "Electrodeless Dielectrophoresis of Single- and Double-Stranded DNA," *Biophysical Journal* 83, 2170 (2002). In addition, the polarization (a relative shift of positive and negative electric charges) of the cloud produces a net dipole moment. Both the charge and the dipole moment lead to DEP of DNA. This DEP phenomenon is postulated to occur with electric fields at low frequencies (about 10 kHz). At higher frequencies (e.g., MHz), the DEP phenomenon observed with DNA molecules has not been well explained, as the mobility of the counterion cloud at these frequencies is not well understood. The conventional analysis of high frequency DEP for micron-sized particles has utilized the Maxwell-Wagner effect. See K. W. Wagner, *Electrotechnik* 3, 83 (1914).

To apply Eq. (1) to DNA molecules, several points should be considered. The relative particle polarization, $\beta^*(\omega)$, only applies to spherical particles, and it has been observed that DNA undergoing DEP is stretched into an ellipsoid. See L. Zheng et al., "Electronic manipulation of DNA, proteins, and nanoparticles for potential circuit assembly," *Biosensors and Bioelectronics* 20, 606 (2004), which is incorporated herein by reference. In the case of an ellipsoid with major axis a and minor axis b, the relative particle polarization is given by:

$$\beta^*(\omega) = \frac{\varepsilon_p^* - \varepsilon_f^*}{\varepsilon_p^* + 2\varepsilon_f^*} = \frac{\varepsilon_p^* - \varepsilon_f^*}{3[A(\varepsilon_p^* - \varepsilon_f^*) + \varepsilon_m^*]} \tag{4}$$

where $\varepsilon^* = \varepsilon - j\frac{\sigma}{\omega}$;

$$A = \frac{1-e^2}{2e^3}\left[\log\left(\frac{1+e}{1-e}\right) - 2e\right], \quad e = \sqrt{1-\left(\frac{b}{a}\right)^2};$$

$\sigma_0$ is the vacuum permittivity; $\sigma_{p/f}$ is the particle/fluid conductivity; and $\in_{p/f}^*$ is the complex permittivity of the particle/fluid. The analysis by Zheng et al. is the most exhaustive for DEP of DNA, but there are some discrepancies that are left to be addressed. The DEP effect on DNA is only observed in low-conductivity solutions (i.e., less than 1 mS/cm), indicating the influence of the counterion cloud (a lower conductivity solution leads to a thicker Debye length, and thus a larger volume counterion cloud surrounding the molecule). An added benefit of a low conductivity buffer is the reduction in Joule heating upon application of the electric field. A final consideration is that for small molecules, the DEP force is significantly opposed by the thermal energy of the molecule (kT), where k is the Boltzman constant and T is the temperature. The ratio of the DEP force to the Brownian motion force is proportional to the radius of the particle to the fourth power. See Zheng et al. Thus, larger field gradients are usually required to overcome Brownian motion of small molecules. Surface micromachined devices are advantageous for this purpose, as photolithography can produce feature sizes as small as 1 μm or less. This produces large electric field gradients ($\nabla E \approx 10^{13} V/m^2$), and thus large DEP forces ($F_{DEP} \propto E \nabla E$). Possible disadvantages of this DEP focusing technique for DNA include the dependence of the polarization effect on the buffer (low ionic strength solutions are needed for focusing DNA) and the unknown effects that the strong electric field will have on the integrity of the DNA molecule.

The size disparity and molecular differences between dsDNA targets and ssDNA probes can be used for DEP separations of these oligonucleotides. A base pair (bp) is approximately 0.3 nm in length (and approximately 660 daltons in weight). Therefore, a 50 by oligonucleotide is about 15 nm in length and a 1000 by oligonucleotide is about 300 nm in length. Differences in the molecular structure between these oligonucleotides may also enhance separations. Austin et al. demonstrated a difference of a factor of about 2 for the DEP force on a ssDNA and dsDNA molecule of the same length, and argued that the increased charge density and longer persistence length of dsDNA leads to larger DEP forces. See C. Chou et al.

DNA focusing experiments were conducted using the DEP columnar focusing device shown in FIG. 6A. A dsDNA sample was prepared by digesting a DNA plasmid (enzymes ScaI and HincII) to yield dsDNA strands of 1.1, 1.8, and 2.9 kbp. Twenty microliters of a 220 ng/μL stock of the digested plasma in Tris-EDTA buffer was mixed with 10 μL of SYBR Green intercalating dye. The solution was then diluted to about 200 μL with DI water. 10-20 μL of the diluted solution was applied to the surface of the device. The devices were then placed beneath an upright fluorescence microscope with Rhodamine and Fluorescein filters. The interdigitated microelectrodes were electrically contacted with micrometer controlled probe tips and actuated with a 0-30 MHz frequency generator. DNA focusing was monitored with an analog video camera and captured directly to a computer workstation with a video capture card.

dsDNA focusing was evidenced in a span of frequencies from 100 kHz to 15 MHz. Focusing at 100 kHz lead to significant competing effects to DEP, namely thermally-induced fluid flow and AC electroosmosis. Megahertz frequencies can be used to eliminate these electrochemical effects and allow larger voltage amplitudes to be applied. Therefore, 1 MHz was chosen as a suitable frequency for focusing. The device contained a large number of traps, primarily in regions between the microelectrodes. Therefore, the focused dsDNA could be rapidly released upon turning off the bias voltage.

Figure 11:
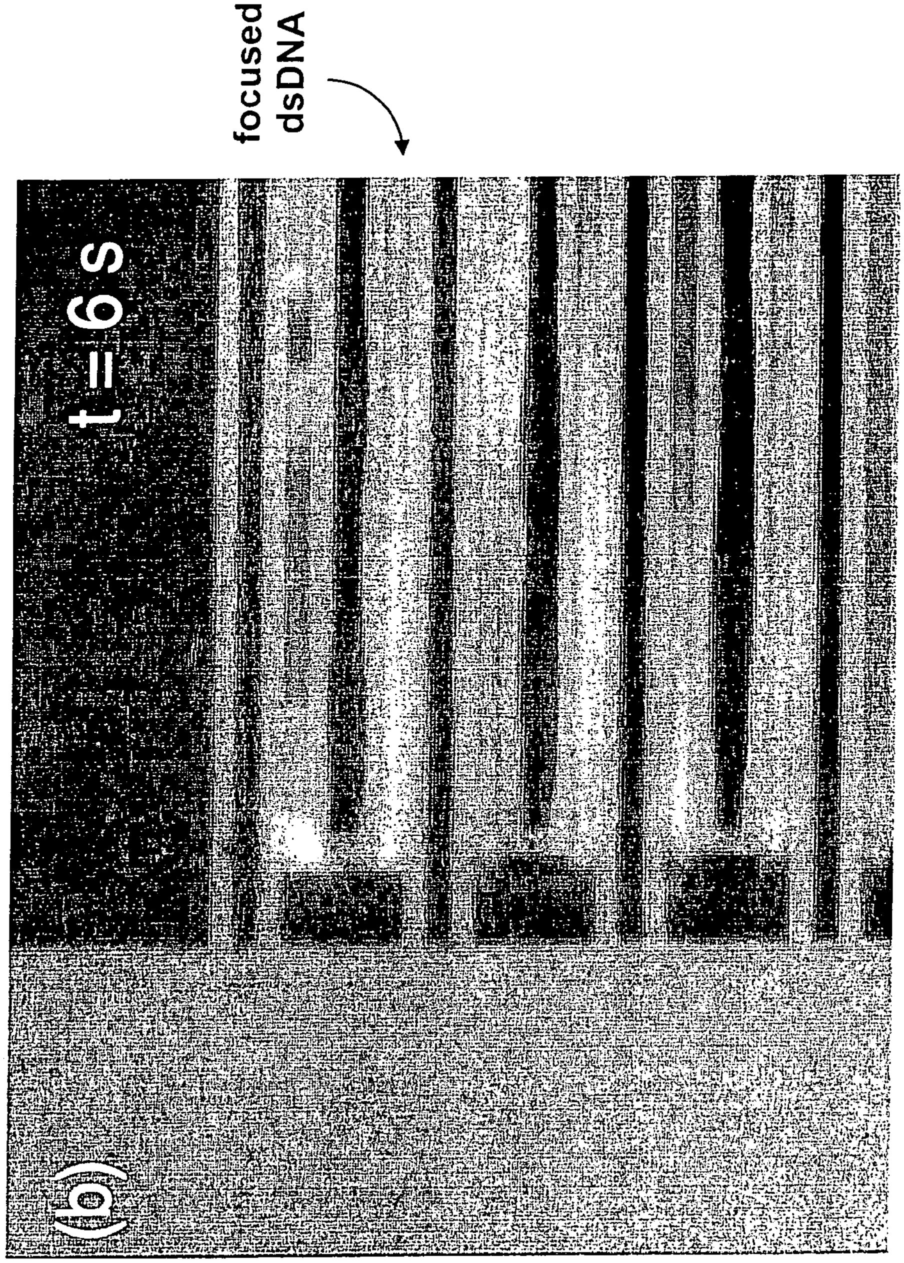
FIG. 11 shows a video photograph of DEP focusing of DNA (1.1, 1.8, and 2.9 kbp) with 20 V p-p and 1 MHz excitation over a period of 6 seconds, using the device shown in FIG. 6A.

In FIG. 11 is shown a video photograph of DEP focusing of dsDNA (1.1, 1.8, and 2.9 kbp) at a voltage of 20 V peak-to-peak excitation at 1 MHz over a period of 6 seconds, using the device shown in FIG. 6A. The DNA was collected in regions between interdigitated microelectrodes that are set to 20 V and 0 V, with no focusing evident in regions between fingers set to the same voltage (either 0 or 20 V). This is expected from the simulation shown in FIG. 6B, which indicates that the regions of largest gradient are located in these interelectrode regions. Therefore, the DNA undergoes pDEP and is collected in regions of large gradient, as shown in the simulations. The dsDNA is collected slightly above the surface where large gradients exist.

Figure 12A:
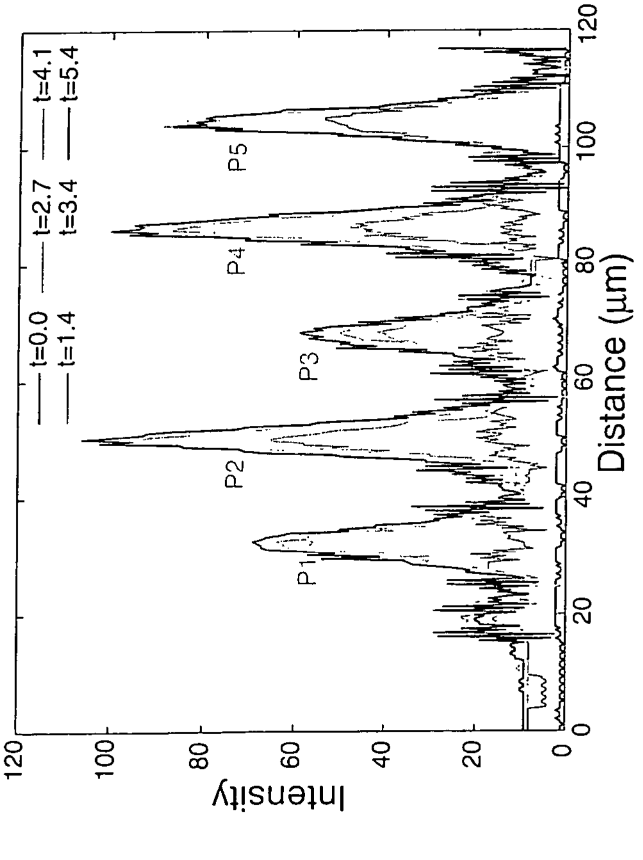
FIG. 12A shows intensity plots of focused dsDNA on the interdigitated microelectrodes. Lineouts are taken from the video photographs from t=0 to t=5.4 s.
Figure 12B:
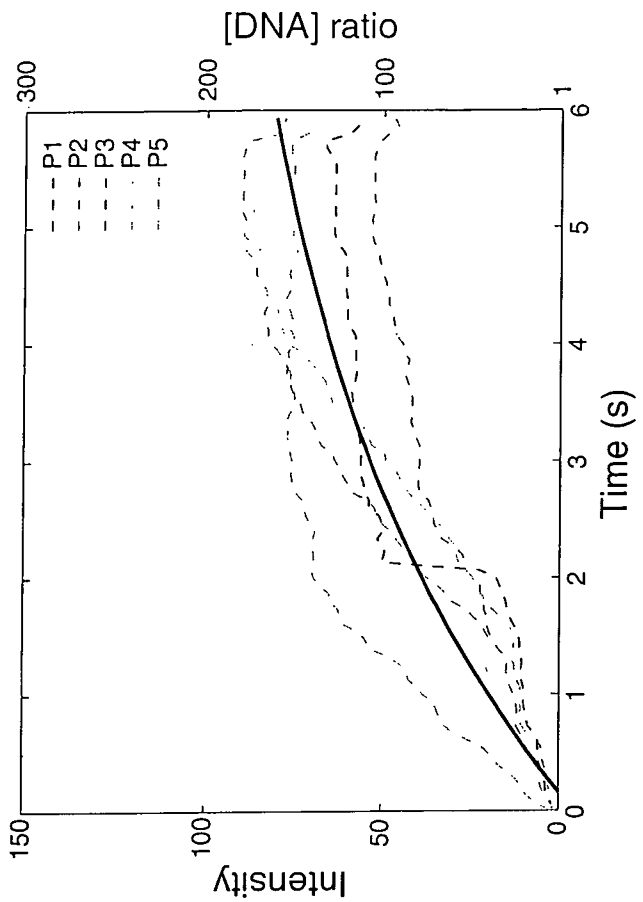
FIG. 12B shows the time evolution of DNA focused at five trap locations.

In FIG. 12A is shown line-out plots of the fluorescence intensity from an experiment of the type shown in FIG. 11. Line scans were taken from the top to the bottom of each frame of the captured video photograph from t=0 to t=5.4 s. The first frame of each video was subtracted from subsequent frames to eliminate the background intensity of free DNA and the microelectrodes. A line scan of length 120 μm containing five peaks (P1 to P5) of dsDNA focused on the interdigitated microelectrodes was analyzed. Distances between peaks were approximately 20 μm, corresponding to the distance between opposed microelectrodes. In FIG. 12B is shown the time evolution of DNA focusing at the five trap locations shown in FIG. 12A. The average intensity value of peaks P1 to P5 was calculated for each time frame using ten values (five on each side) surrounding the maximum intensity of each peak. The average time course was fit with an exponential curve $A\text{-}Be^{-t/T}$, with A=−2.371, B=−0.105, and t=1.75 s ($r^2$=0.981). The time constant was calculated to be 1.75 s. See C. L. Asbury and G. van den Engh, "Trapping of DNA in nonuniform oscillating electric fields," *Biophysical Journal* 74, 1024 (1998).

Figure 13A:
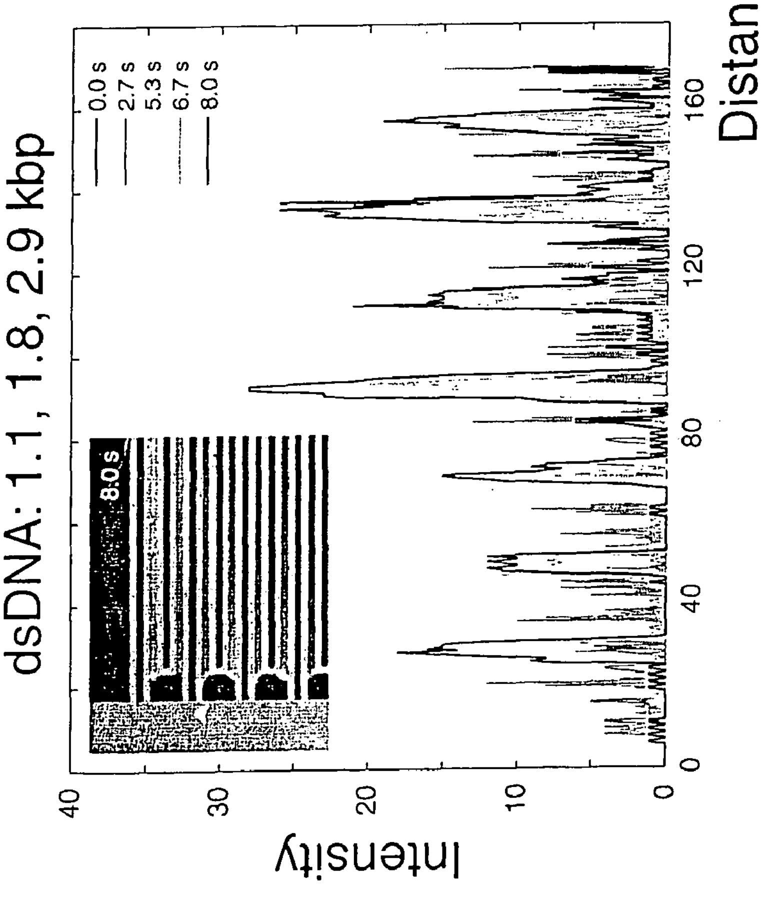
FIGS. 13A and 13B show intensity plots of the focused DNA under a DEP force (20 V p-p, 1 MHz excitation).
Figure 13B:
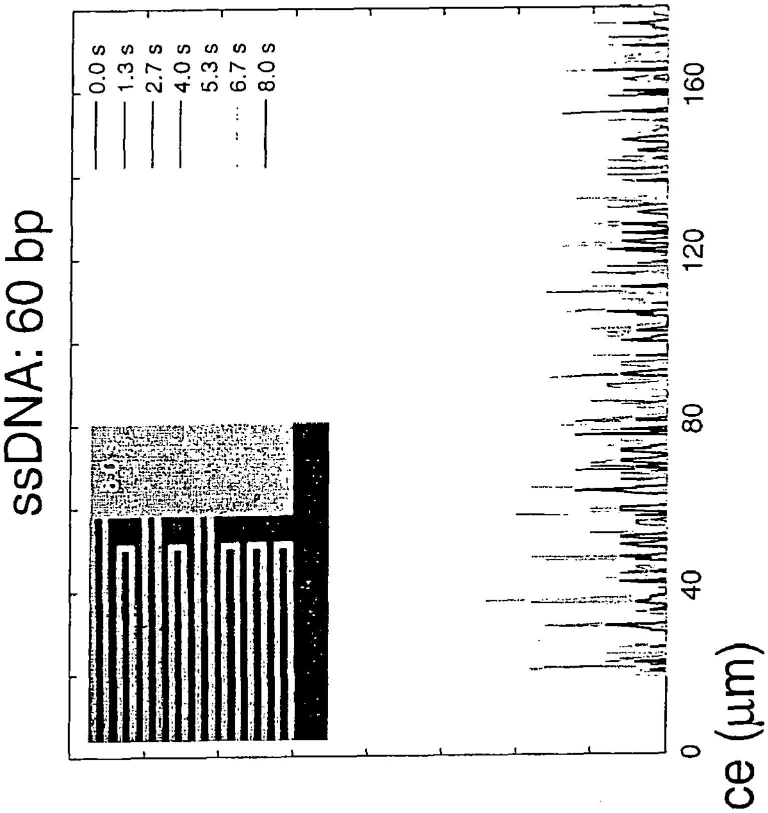

Experiments were also performed using a 60 by ssDNA oligonucleotide. Ten μL of SYBR Green and 10 μL of the oligonucleotide (100 μM in water) were combined and diluted to a total volume of about 200 μL with DI water. In FIGS. 13A and 13B are shown the focusing of dsDNA to ssDNA in two separate experiments over similar time courses. The excitation signal was 20 V p-p at 1 MHz. These figures demonstrate the selective preconcentration of kilo-base-pair double-stranded DNA into pre-defined regions. FIG. 13A shows the fluorescence intensity lineouts of seven trap locations of dsDNA on the microelectrode device. The lineouts for ssDNA, shown in FIG. 13B, show no evidence of focusing in between oppositely potentiated microelectrodes. Therefore, the small single-stranded oligonucleotides were not preconcentrated and thus will be flushed from a flow through system.

The present invention has been described as a dielectric columnar focusing device. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A dielectrophoretic columnar focusing device, comprising:

an insulating substrate;

a set of interdigitated microelectrodes having at least two opposing microelectrode fingers, wherein the at least two opposing microelectrode fingers comprises at least one double-forked finger and wherein the fingers of each fork have a uniform lateral spacing in a longitudinal direction, on the insulating substrate;

a fluid, containing at least one particle, in electromagnetic contact with the set of interdigitated microelectrodes; and means for applying a differential alternating current electrical potential between the at least two opposing microelectrode fingers to generate at least one cylindrical potential well in the longitudinal direction in the fluid, thereby polarizing the at least one particle and causing the polarized particle to move toward or away from the at least one cylindrical potential well in response to a gradient in the electric field.

2. The device of claim 1, wherein the alternating current has a frequency greater than 100 kHz.

3. The device of claim 2, wherein the alternating current has a frequency greater than 1 MHz.

4. The device of claim 1, wherein the at least one particle is less than 25 microns in cross-section.

5. The device of claim 1, wherein the at least one particle comprises DNA.

6. The device of claim 1, wherein the at least one particle comprises a biological cell.

7. The device of claim 1, further comprising means for flowing the fluid such that the fluid flow has a component in the longitudinal direction of the microelectrode fingers.

8. The device of claim 7, wherein the device comprises a flow cytometer.

9. The device of claim 1, wherein the set of microelectrodes generates at least one cylindrical potential well comprising a minimum in the electric field gradient.

10. The device of claim 1, wherein the set of interdigitated microelectrodes is in direct fluidic contact with the fluid.

11. The device of claim 1, wherein the set of interdigitated microelectrodes is separated from the fluid by an insulating layer.

* * * * *